(12) United States Patent
Chida et al.

(10) Patent No.: US 11,907,365 B2
(45) Date of Patent: Feb. 20, 2024

(54) INFORMATION PROCESSING DEVICE AND INFORMATION PROCESSING PROGRAM

(71) Applicant: NIPPON TELEGRAPH AND TELEPHONE CORPORATION, Tokyo (JP)

(72) Inventors: Nariyoshi Chida, Musashino (JP); Yo Kanemoto, Musashino (JP); Kazufumi Aoki, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 526 days.

(21) Appl. No.: 17/283,552

(22) PCT Filed: May 20, 2019

(86) PCT No.: PCT/JP2019/019976
§ 371 (c)(1),
(2) Date: Apr. 8, 2021

(87) PCT Pub. No.: WO2020/075333
PCT Pub. Date: Apr. 16, 2020

(65) Prior Publication Data
US 2021/0390178 A1    Dec. 16, 2021

(30) Foreign Application Priority Data
Oct. 10, 2018  (JP) .................................. 2018-192048

(51) Int. Cl.
*G06F 21/55*    (2013.01)
*G06F 40/205*   (2020.01)
*H04L 9/40*     (2022.01)

(52) U.S. Cl.
CPC ............ *G06F 21/55* (2013.01); *G06F 40/205* (2020.01); *H04L 63/1416* (2013.01); *H04L 63/1425* (2013.01); *G06F 2221/034* (2013.01)

(58) Field of Classification Search
CPC .. G06F 21/55; G06F 40/205; G06F 2221/034; G06F 21/552; H04L 63/1416; H04L 63/1425
See application file for complete search history.

(56) References Cited

U.S. PATENT DOCUMENTS 9,060,017 B2 *  6/2015  Marion ............... H04L 63/1416
2017/0223046 A1 *  8/2017  Singh .................. H04L 63/1491

OTHER PUBLICATIONS

King et al., "Backtracking Intrusions", ACM Transactions on Computer Systems, vol. 23, No. 1, Feb. 2005, pp. 51-76.

(Continued)

*Primary Examiner* — Huan V Doan
(74) *Attorney, Agent, or Firm* — XSENSUS LLP

(57) ABSTRACT

An information processing device includes an element extraction unit that extracts elements relating to actions of an attacker from each input log, a generation unit that generates a parser based on definition information defining the actions of the attacker in a formal grammar, the parser detecting, from a log, a log string having a feature corresponding to an action defined by the definition information, a parsing unit that detects, from a log consisting of the elements extracted by the element extraction unit, log strings having features corresponding to the actions defined by the definition information by using the parser, and a reconstruction unit that reconstructs the log strings detected by the parsing unit, adds a label indicating an action defined by the definition information to each of the reconstructed log strings, and outputs the labeled log strings as a log corresponding to a series of actions of the attacker.

4 Claims, 13 Drawing Sheets

(56) References Cited

OTHER PUBLICATIONS

Liu et al., "Towards a Timely Causality Analysis for Enterprise Security", Network and Distributed Systems Security (NDSS) Symposium 2018, Feb. 18-21, 2018, pp. 1-15.
Pei et al., "HERCULE: Attack Story Reconstruction via Community Discovery on Correlated Log Graph", ACSAC, Dec. 5-9, 2016, 13 pages.
"Free Security Software", Available Online at: https://www.fireeye.com/services/freeware.html, Retrieval Date: Sep. 28, 2018, pp. 1-3.
"IIJ Security Diary: A Definition and The Detection of the Menace Existence Trace Using OpenIOC", IIJ-SECT, Available Online at: https://sect.iij.ad.jp/d/2012/02/278431.html, Retrieval date: Sep. 28, 2018, 5 pages including English Translation.

* cited by examiner

FIG.3

```
<Event xmlns="http://schemas.AAAAAA.com/win/2004/08/events/event">
 <System>
  <Provider Guid="{9e814aad-3204-11d2-9a82-006008a86939}" />
  <EventID>0</EventID>
  <Version>2</Version>
  <Level>0</Level>
  <Task>0</Task>
  <Opcode>11</Opcode>
  <Keywords>0x0</Keywords>
  <TimeCreated SystemTime="2018-07-11T10:28:06.0781100000Z" />         W1
  <Correlation ActivityID="{00000000-0000-0000-0000-000000000000}" />
  <Execution ProcessID="4294967295" ThreadID="4294967295" ProcessorID="0" KernelTime="0" UserTime="0" />
  <Channel />
  <Computer />
 </System>
 <EventData>
  <Data Name="PID">       3228</Data>
  <Data Name="size">       455</Data>
  <Data Name="daddr">192.168.56.101</Data>          W2
  <Data Name="saddr">10.0.2.15</Data>
  <Data Name="dport">8080</Data>
  <Data Name="sport">49636</Data>
  <Data Name="seqnum">       0</Data>
  <Data Name="connid">0x0</Data>
 </EventData>
 <RenderingInfo Culture="ja-JP">
  <Opcode>RecvIPV4</Opcode>
  <Provider>MSNT_SystemTrace</Provider>
  <EventName xmlns="http://schemas.AAAAAA.com/win/2004/08/events/trace">TcpIp</EventName>
 </RenderingInfo>
 <ExtendedTracingInfo xmlns="http://schemas.AAAAAA.com/win/2004/08/events/trace">
  <EventGuid>{9a280ac0-c8e0-11d1-84e2-00c04fb998a2}</EventGuid>
 </ExtendedTracingInfo>
</Event>
```

(1) LOG

⇒

- RECORDED TIME=2018-07-11T10:28:06.0781100000Z
- DESTINATION ADDRESS=192.168.56.101
- SOURCE ADDRESS=10.0.2.15
- DESTINATION PORT=8080
- SOURCE PORT=49636

(2) EXTRACTED ELEMENTS

FIG.4

```
APT = ([Delivery .)* Delivery ([Exploitation .)* Exploitation ([Installation .)* Installation C2? ({Objective .)* Objective Delivery = FileDownload FileDownload = [fname=M.*doc", opcode="FileCreate*"] [fname=", *Identifier"]
             | [regkeyname="Software\AAAAAA\BBBBB\CurrentVersion\Policies\Attachments"]

Exploitation = [regkeyname="Puebzr"]

Installation = [fname=', *vbs', opcode="FileCreate"]
             | [regkeyname="HKEY_LOCAL_MACHINE\Software\AAAAAA\BBBBB\CurretVersion\Run"]

C2 = [saddr="10.0.2.15"]

Objective = [fname=", *secret[.]docx[.]lnk", opcode="FileDelete"]
```

TERMINAL SYMBOL

Expression = Sum
Sum = Product ( ( '+' / '-' ) Product )*
Product = Value ( ( '*' / '/' ) Value )*
Value = [0-9]+

FIG.6

APT = (!Delivery . )* Delivery (!Exploitation . )* Exploitation (!Installation . )* Installation C2? ({Objective . )* Objective Delivery = FileDownload FileDownload = [fname=M.*doc", opcode="FileCreate*"] [fname=".*Identifier"]
| [regkeyname="Software\AAAAAA\BBBBBB\CurrentVersion\Policies\Attachments"]

Exploitation = [[regkeyname="Puebzr"]] ------ TERMINAL SYMBOL

Installation = [fname=´.*vbs´, opcode="FileCreate"]
| [regkeyname="HKEY_LOCAL_MACHINE\Software\AAAAAA\BBBBBB\CurretVersion\Run"]

C2 = [saddr="10.0.2.15"]

Objective = [fname=".*secret[.]docx[.]lnk", opcode="FileDelete"]

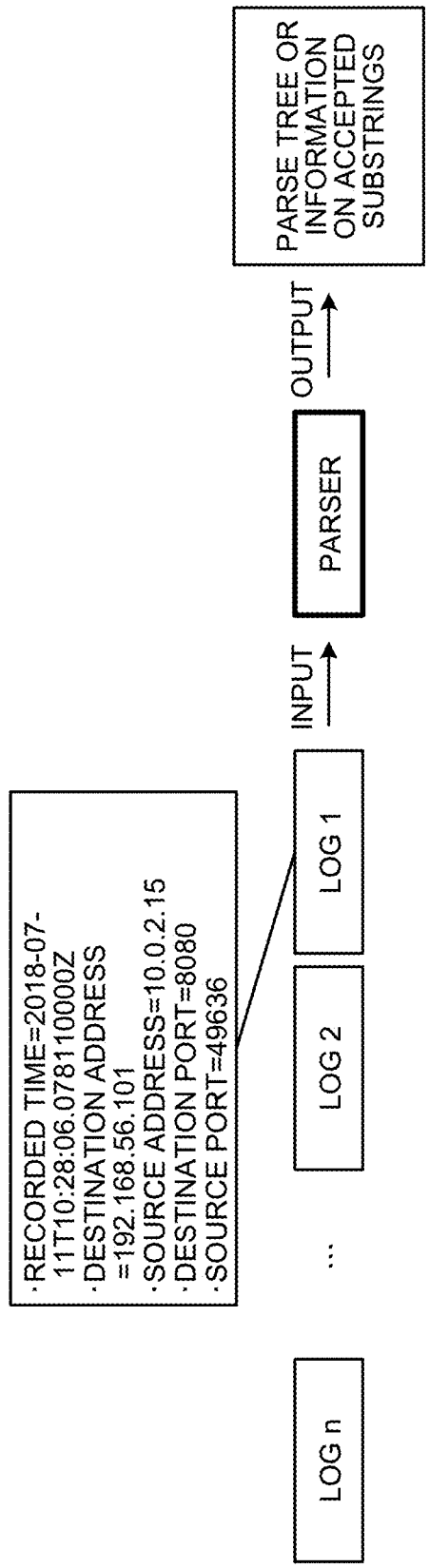

FIG. 8A

```
APT = (!Delivery .)* Delivery (!Exploitation .)* Exploitation (!Installation .)* Installation C2? ({Objective .)* Objective     ⟵ P1

Delivery = FileDownload                                                                                   ⟵ W12

FileDownload = [fname=M.*doc", opcode="FileCreate*"] [fname=".*Identifier"]
             | [regkeyname="Software\AAAAAA\BBBBB\CurrentVersion\Policies\Attachments"]

Exploitation = [regkeyname="Puebzr"]

Installation = [fname='.*vbs´ ,opcode="FileCreate"]
             | [regkeyname="HKEY_LOCAL_MACHINE\Software\AAAAAA\BBBBBB\CurretVersion\Run"]

C2 = [saddr="10.0.2.15"]

Objective = [fname=".*secret[.]docx[.]lnk",opcode="FileDelete"]                                           ⟵ W13
```

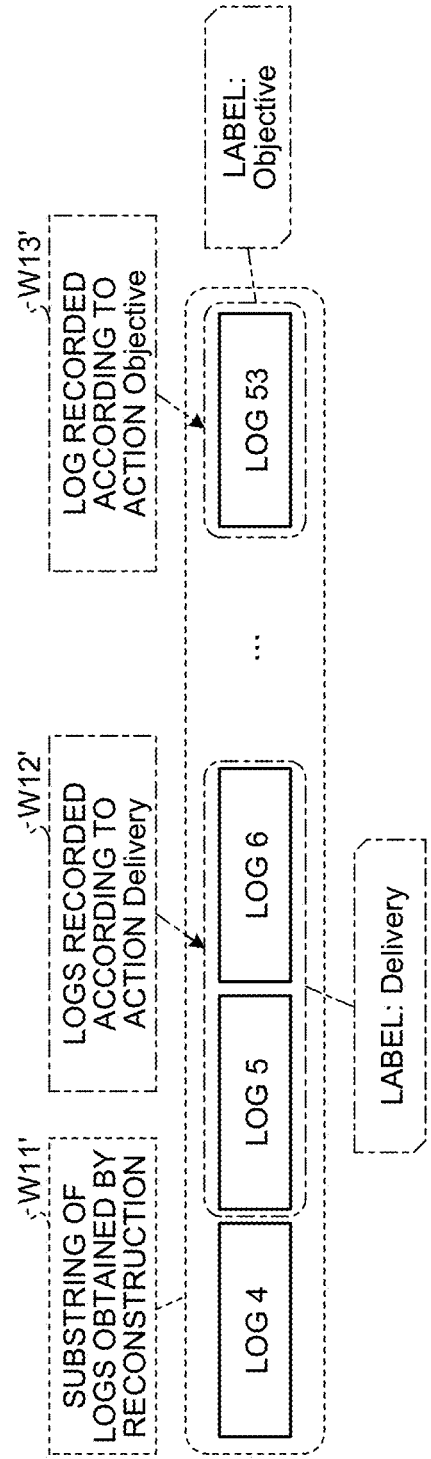

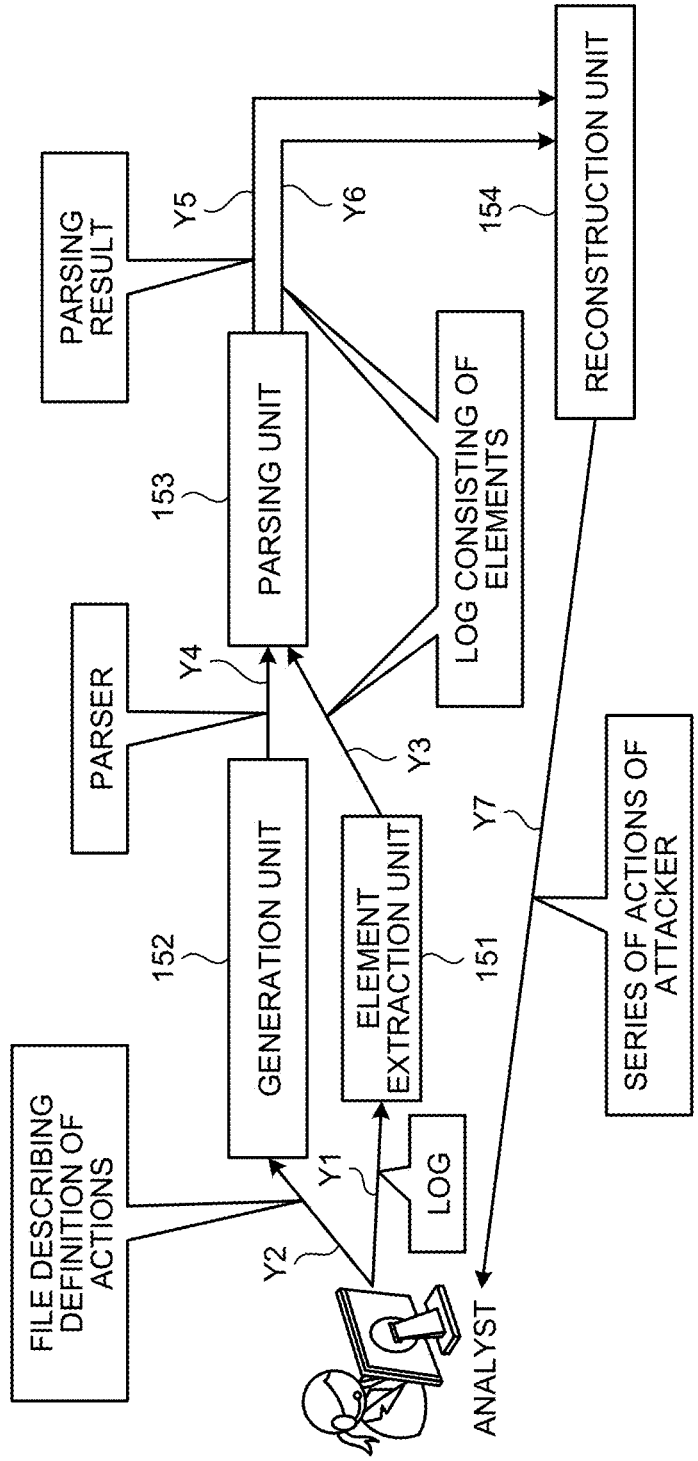

```
Behavior = (!Delivery .)* Delivery (!Installation .)* Installation
Delivery = [fname=".*Identifier"]
Installation = [fname=".*vbs",opcode="FileCreate"]
             | [regkeyname=".*\Run"]
```
~T1

INFORMATION PROCESSING DEVICE AND INFORMATION PROCESSING PROGRAM

CROSS-REFERENCE TO RELATED APPLICATIONS

The present application is based on PCT filing PCT/JP2019/019976, filed May 20, 2019, which claims priority to JP 2018-192048, filed Oct. 10, 2018, the entire contents of each are incorporated herein by reference.

FIELD

The present invention relates to an information processing device and an information processing program.

BACKGROUND

Incident investigation requires an analyst to collect and analyze logs from an environment in which damage has occurred and determine a series of actions of the attacker to find, for example, whether an attack vector is present or information leakage has occurred. This investigation is known as such a time-consuming work that various studies have been made to improve investigation efficiency.

Conventional technologies (see Non Patent Literatures 1 and 2) provide a method of correlating logs based on information indicating explicit dependency between the logs to apply this method to incident investigation.
In this method, for example, process IDs and parent process IDs are set to be the information indicating explicit dependency between logs to correlate the logs.

Alternatively, another conventional technology (see Non Patent Literature 3) provides a method of correlating logs based on information shared between logs, not only on the information indicating explicit dependency between logs. In this method, identical file names contained in two logs are set to be the information shared between the logs to correlate the logs.

For another example, open indicators of compromise (OpenIOC) framework is known (see Non Patent Literatures 4 and 5). This method can define artifacts of attacks by using a conditional expression including terms for checking a match of, for example, file names or hash values connected by AND or OR logic. This method allows an analyst to investigate by using a defined IOC whether any artifact is left in the environment to be investigated.

CITATION LIST

Patent Literature

Non Patent Literature 1: Samuel T. King and Peter M. Chen, "Backtracking Intrusions", ACM Transactions on Computer Systems, Vol. 23, No. 1, February 2005, Pages 51-76.
Non Patent Literature 2: Yushan Liu et al, "Towards a Timely Causality Analysis for Enterprise Security", NDSS, 2018.
Non Patent Literature 3: Kexin Pei et al, "HERCULE: Attack Story Reconstruction via Community Discovery on Correlated Log Graph", ACSAC, 2016.
Non Patent Literature 4: Free Security Software, [online], [Searched on Sep. 28, 2018], Internet <URL:https://www.fireeye.com/services/freeware.html>
Non Patent Literature 5: IIJ-SECT, [online], [Searched on Sep. 28, 2018], Internet, <URL:https://sect.iij.ad.jp/d/2012/02/278431.html>

SUMMARY

Technical Problem

The methods disclosed in Non Patent Literatures 1 to 3 concentrate only on finding a series of actions of the attacker, and fail to use the found actions of the attacker to improve the efficiency of future investigation.

The methods disclosed in Non Patent Literatures 4 and 5 cannot fully describe a series of actions of an attacker in the expressions. The methods disclosed in Non Patent Literatures 4 and 5 can describe a conditional expression using AND or OR logic but cannot describe an expression indicating the order or repetition of the terms.

Consider, for example, the following actions.
Term 1: External file x has been downloaded.
Term 2: File x has been executed.
Term 3: External communication has occurred.
Term 4: Remote login communication has occurred.
Term 5: Remote login has failed.

If these terms 1 to 5 appear in this order, the methods disclosed in Non Patent Literatures 4 and 5 can determine a possible attack because the series of actions are similar to a known attack pattern. When investigation is based only on the presence or absence of each term without consideration of the order of the terms, however, the methods disclosed in Non Patent Literatures 4 and 5 cannot determine a possible attack because actions corresponding to the respective terms are not an attack and occur frequently.

The present invention has been made in view of the foregoing, and it is an object of the present invention to provide an information processing device and an information processing program that can formalize and reconstruct a series of actions of an attacker based on logs.

Solution to Problem

An information processing device includes: an element extraction unit configured to extract elements relating to actions of an attacker from each input log;
a generation unit configured to generate a parser based on definition information that defines the actions of the attacker in a formal grammar, the parser being configured to detect, from a log, a log string having a feature corresponding to an action defined by the definition information; a parsing unit configured to detect, from a log consisting of the elements extracted by the element extraction unit, log strings having features corresponding to the actions defined by the definition information by using the parser; and a reconstruction unit configured to reconstruct the log strings detected by the parsing unit, add a label indicating an action defined by the definition information to each of the reconstructed log strings, and output the labeled log strings as a log corresponding to a series of actions of the attacker.

Advantageous Effects of Invention

According to the present invention, a series of actions of an attacker can be formalized and reconstructed based on logs.

BRIEF DESCRIPTION OF DRAWINGS

FIG. 3 is a diagram illustrating an example of element extraction performed by an element extraction unit.

FIG. 4 is a diagram illustrating an example file that defines actions in a formal grammar.

FIG. 5 is a diagram illustrating an example syntax of actions defined in a typical formal grammar.

FIG. 6 is a diagram illustrating an example syntax of actions defined in a formal grammar according to the embodiment.

FIG. 7 is a diagram illustrating a process performed by a parsing unit.

FIG. 8A is a diagram for explaining a labeling process of a reconstruction unit.

FIG. 8B is another diagram for explaining the labeling process of the reconstruction unit.

FIG. 9 is a diagram illustrating the procedure performed by the information processing device.

DESCRIPTION OF EMBODIMENT

Figure 1:
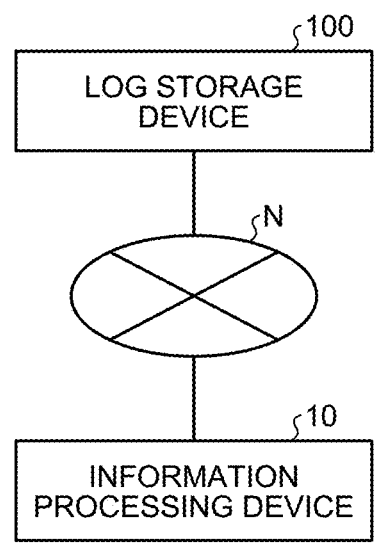
FIG. 1 is a schematic diagram illustrating an example configuration of an information processing system according to an embodiment.

The following describes an embodiment of the present invention with reference to the accompanying drawings. The embodiment is not intended to limit the scope of the present invention. The same reference signs refer to the same portions in the drawings.

[Embodiment]

The following describes an embodiment of the present invention. Described in the embodiment according to the present invention are an information processing device and an information processing program that are configured to formalize and reconstruct a series of actions of an attacker based on acquired logs. There are many models (e.g., cyber kill chain, cyber attack lifecycle) for defining a series of actions of an attacker. If intended attacks are different but the actions of the attacks are the same, patterns of the actions can be formalized. From this point of view, the following describes a technique of formalizing a series of actions of an attacker and reconstructing a series of actions of an attacker acquired from logs in accordance with the formalized actions. First, an example information system according to the embodiment is described.

[Configuration of Information System]

FIG. 1 is a schematic diagram illustrating an example configuration of an information processing system according to the embodiment. This information processing system illustrated in FIG. 1 includes, for example, a log storage device 100 and an information processing device 10 that are connected via a network N such as the Internet or a leased line.

The log storage device 100 stores therein logs to be investigated by an analyst. The log storage device 100 provides logs to be investigated to the information processing device 10 via the network N. The logs to be investigated are not necessarily stored in the log storage device 100 but may be stored in the information processing device 10.

The information processing device 10 formalizes and reconstructs a series of actions of an attacker based on acquired logs, and outputs the reconstructed logs as a log corresponding to the series of actions of the attacker. The information processing device 10 performs the following procedure.

Specifically, the information processing device 10 first defines distinct elements appearing in a log that records actions of an attacker and defines the relations between the actions in a formal grammar, and then extracts logs that satisfy the definition. A formal grammar is configured by nonterminal symbols and expressions indicating patterns to be accepted by the symbols, and is described as, for example, A=e, where A is a nonterminal symbol and e is an expression indicating a pattern to be accepted by A. The formal grammar according to the present embodiment is modified such that elements acquired from logs are used as terminal symbols. The formal grammar described in the following example is parsing expression grammar with unordered choices (PEGwUC), but the formal grammar is not limited thereto. In other words, PEGwUC can be substituted with other formal grammars with the same modification being made.

The information processing device 10 can correlate logs in accordance with the procedure above if they have no explicit dependency or shared information. The information processing device 10 can define what kind of action has caused the log to be recorded.

[Information Processing Device]

Figure 2:
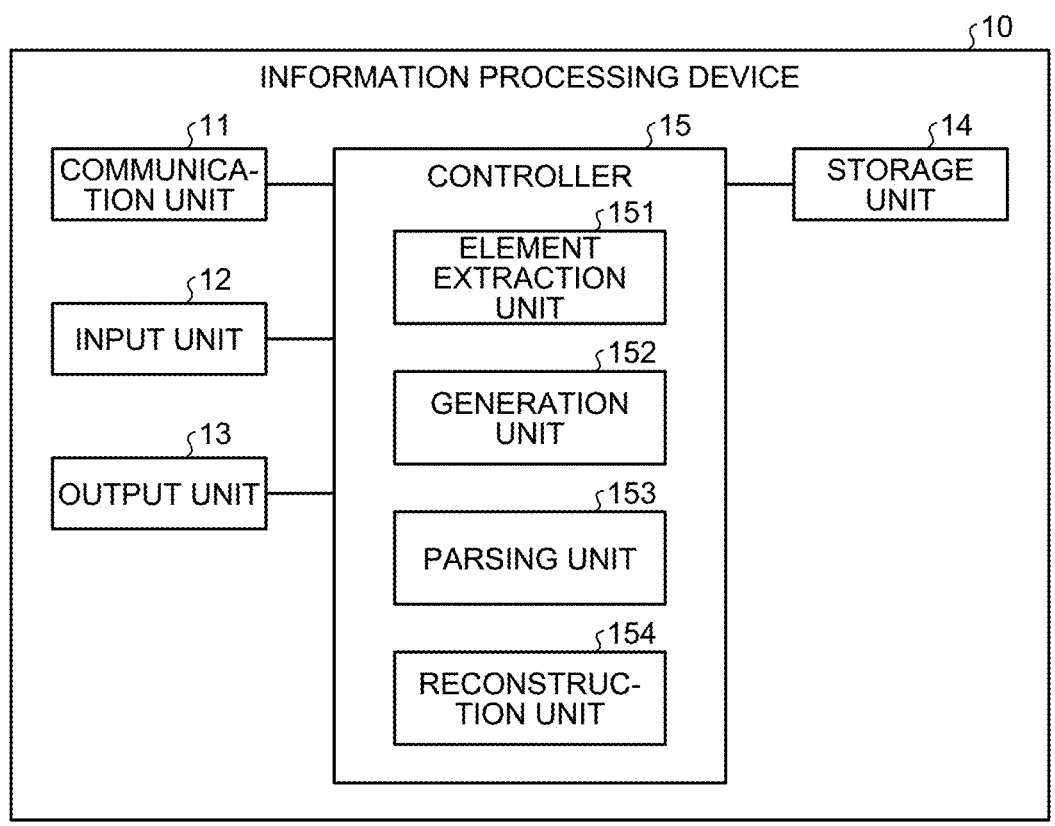
FIG. 2 is a block diagram illustrating a configuration of an information processing device.

Described next is a configuration of the information processing device 10. FIG. 2 is a block diagram illustrating the configuration of the information processing device 10 illustrated in FIG. 1. As illustrated in FIG. 2, the information processing device 10 includes a communication unit 11, an input unit 12, an output unit 13, a storage unit 14, and a controller 15.

The communication unit 11 is a communication interface through which various types of information are transmitted and received to and from other devices connected via, for example, the network. The communication unit 11 is implemented by, for example, a network interface card (NIC) and enables the controller 15 to communicate with other devices via electric communication line such as a local area network (LAN) or the Internet. The communication unit 11, for example, receives a log to be investigated via, for example, the network N and inputs it to the controller 15. The communication unit 11 receives a file that defines actions in a formal grammar and inputs the file to the controller 15. The communication unit 11 may transmit a reconstructed log corresponding to a series of actions of an attacker to the other devices via, for example, the network N.

The input unit 12 is an input interface configured to receive operations from an operator of the information processing device 10. The input unit 12 is configured by, for example, input devices such as a touch panel, a voice input device, a keyboard, and a mouse.

The output unit 13 is implemented by, for example, a display device such as a liquid crystal display, a printing device such as a printer, and an information communication device. The output unit 13 outputs a reconstructed log representing a series of actions of an attacker to an operator (e.g., analyst).

The storage unit 14 is implemented by a semiconductor memory such as a random-access memory (RAM) or a flash memory or by a storage device such as a hard disk or an optical disc. The storage unit 14 stores therein a processing program for causing the information processing device 10 to operate and data for use in executing the processing program.

The controller 15 includes an internal memory for storing a computer program defining, for example, various procedures and necessary data. The controller 15 executes various types of processing by using the computer program and the data. The controller 15 is, for example, an electric circuit such as a central processing unit (CPU) or a micro processing unit (MPU). The controller 15 includes an element extraction unit 151, a generation unit 152, a parsing unit 153, and a reconstruction unit 154.

The element extraction unit 151 extracts elements relating to actions of an attacker from each input log.

The element extraction unit 151 receives logs to be investigated and extracts elements from each recorded log. An element is a distinctive portion that appears in a log recording a series of actions of an attacker. The element extraction unit 151 outputs a log consisting of the extracted elements to the parsing unit 153.

The element extraction unit 151 receives logs to be investigated and extracts elements from each recorded log. Examples of elements to be extracted include recorded time, a process ID, a parent process ID, a user ID, a command line, a destination address, a destination port, a file name, a domain name of domain name system (DNS), an IP address obtained by name resolution, a process name, an absolute path of a GET request, and an absolute path of a POST request. An element may be a distinctive portion that appears in a log recording a series of actions of an attacker and is not limited to the examples above. The information processing device 10 can add or delete elements as appropriate.

FIG. 3 is a diagram illustrating an example of element extraction performed by the element extraction unit 151. The element extraction unit 151 extracts recorded time "2018-07-11T10:28:06.078110000Z" from the description in a region W1 of a log illustrated in FIG. 3 (1). The element extraction unit 151 extracts the destination address "192.168.56.101", the source address "10.0.2.15", the destination port "8080", and the source port "49636" from the description in a region W2 of the log in FIG. 3 (1) (see FIG. 3(2)). The element extraction unit 151 outputs a log consisting of the extracted elements to the parsing unit 153.

The generation unit 152 generates a parser based on definition information that defines actions of an attacker in a formal grammar. The parser is configured to detect, from a log, a log string having a feature corresponding to an action defined by the definition information. The definition information defines, in a formal grammar, distinctive elements appearing in a log that records actions. The definition information is input in a file format. The formal grammar used for the definition information deals with the elements as terminal symbols. The definition information also defines nonterminal symbols. The definition information includes information indicating the order of the actions of the attacker. The parser detects, from a log, a log string having a feature corresponding to an action defined by the definition information. The generation unit 152 outputs the generated parser to the parsing unit 153.

The generation unit 152 receives, as definition information, a file that defines the attacks of an attacker in a formal grammar. FIG. 4 is a diagram illustrating an example file that defines actions in a formal grammar. The formal grammar used in the file illustrated in FIG. 4 is PEGwUC.

A typical formal grammar deals with characters as terminal symbols. The generation unit 152, however, deals with the elements acquired from a log as terminal symbols. Examples of typical formal grammars include regular grammars, context-free grammars, parsing expression grammars, and Boolean grammars.

In the formal grammar according to the present embodiment, the terminal symbols are written as [(element name 1) (operator 1) (element value 1), (element name 2) (operator 2) (element value 2), . . . ]. For example, terminal symbols are written as [fname="dummy.txt"] and [opcode="FileCreate",dport>50,dport<=80]. In the present embodiment, the terminal symbols are represented by logical formulas. Symbols and expressions other than the terminal symbols are written in the same manner as in the typical formal grammars.

The following describes specific description examples. FIG. 5 is a diagram illustrating an example syntax of four arithmetic operations defined in a typical formal grammar. FIG. 6 is a diagram illustrating an example syntax of actions defined in the formal grammar according to the embodiment. When, for example, the syntax of the four arithmetic operations is defined in PEGwUC as illustrated in FIG. 5, characters surrounded by """ and """ are terminal symbols in a typical PEGwUC. As illustrated in FIG. 6, however, a sequence of elements surrounded by "[" and "]" are terminal symbols in PEGwUC in the present embodiment. The formal grammar used in the generation unit 152 deals with the elements as terminal symbols.

The generation unit 152 generates a parser by using a file that defines the actions of the attacker in a formal grammar. The parser is configured to detect, from a log, a log string having a feature corresponding to an action of the attacker.

The parsing unit 153 parses a log consisting of the elements extracted by the element extraction unit 151 by using the parser generated by the generation unit 152. The parsing unit 153 detects, from the log consisting of the elements extracted by the element extraction unit 151, log strings having features corresponding to the actions defined by the definition information. The parsing unit 153 processes the detected log strings into a reconstructible form. The parsing unit 153 outputs the parsing result to the reconstruction unit 154.

The parsing unit 153 parses a log consisting of the elements extracted at the step of extracting elements by using the parser such that the parsing unit 153 detects, from the log, log strings having features corresponding to the actions defined by the definition information. The parsing unit 153 processes the detected log strings into a reconstructible form so that the series of actions of the attacker can be reconstructed from the detected log strings.

FIG. 7 is a diagram illustrating the process performed by the parsing unit 153. For example, a log 1 in FIG. 7 includes elements extracted by the element extraction unit 151, which are illustrated in FIG. 3 (2). As illustrated in FIG. 7, the parsing unit 153 generates a parse tree or records the information on accepted substrings so that the log strings detected by the parser can be reconstructed in the subsequent process.

The reconstruction unit 154 adds labels indicating the actions defined by the definition information to the log strings detected by the parsing unit 153. The reconstruction unit 154 then outputs the labeled log strings as a log corresponding to a series of actions of the attacker.

The reconstruction unit 154 reconstructs the accepted log strings based on the parsing result. The reconstruction unit 154 reconstructs the log strings based on the parse tree or the information on the recorded substrings. The reconstruction unit 154 adds the labels indicating the actions of the attacker to log strings detected by the parsing unit 153 out of the reconstructed log strings. Each label indicates a type of action defined by the definition information. Examples of the types of actions include phases of the cyber kill chain, such as delivery, exploitation, installation, and command and control.

FIGS. 8A and 8B are diagrams for explaining the labeling process of the reconstruction unit 154. FIG. 8A illustrates a formal grammar file P1 that is the definition information. FIG. 8B illustrates an example labeling process to the logs based on the types of the actions defined by the formal grammar file P1. When a log string of the reconstructed log strings includes a substring that matches a nonterminal symbol included in the definition information, the substring is determined to be an action of the attacker corresponding to the nonterminal symbol.

Suppose that, as illustrated in FIG. 8B, the reconstruction unit 154 acquires a substring W11' including, for example, logs 4 to 53 after the reconstruction process. Among the logs in the substring W11', the reconstruction unit 154 adds a label "Delivery" to the logs 5 and 6 (see frame W12' in FIG. 8B) that have been recorded in accordance with the action "Delivery" (see frame W12 in FIG. 8A) based on the formal grammar file P1. Among the logs in the substring W11', the reconstruction unit 154 adds a label "Objective" to the log 53 (see frame W13' in FIG. 8B) that has been recorded in accordance with the action "Objective" (see frame W13 in FIG. 8A).

If the reconstruction unit 154 detects a portion containing ambiguity due to the symbol "|" indicating a choice included in the formal grammar file P1 in reconstructing the log strings, the reconstruction unit 154 prioritizes an element at the beginning of the elements separated by the choice "|" in selecting elements. The processes described above can detect distinctive portions from the portions corresponding to the series of actions of the attacker included in the strings of the log to be investigated.

The reconstruction unit 154 then disposes the log 53 labeled with "Objective" after the logs 5 and 6 labeled with "Delivery" in accordance with the order of the actions defined by the formal grammar file P1. The reconstruction unit 154 outputs the logs disposed in accordance with the order of actions of the attacker as a log representing a formalized series of actions of the attacker.

As described above, the reconstruction unit 154 reconstructs the log strings detected by the parsing unit 153 from the log consisting of the elements input from the element extraction unit 151. The reconstruction unit 154 adds labels to the reconstructed log strings. The reconstruction unit 154 disposes the reconstructed labeled log strings in the order of the definition information and outputs this log as a log representing a formalized series of actions of the attacker.

[Procedure]

FIG. 9 is a diagram illustrating the procedure performed by the information processing device 10. As illustrated in FIG. 9, upon receiving logs to be investigated (see arrow Y1 in FIG. 9), the element extraction unit 151 extracts elements from each input log and outputs a log consisting of the extracted elements to the parsing unit 153 (see arrow Y3 in FIG. 9).

Upon receiving a file (definition information) that defines the actions of an attacker (see arrow Y2 in FIG. 9), the generation unit 152 generates a parser and outputs the generated parser to the parsing unit 153 (see arrow Y4 in FIG. 9).

The parsing unit 153 uses the parser to parse the log consisting of the extracted elements such that the parsing unit 153 detects log strings having features corresponding to the defined actions, and outputs the parsing result to the reconstruction unit 154 (see arrow Y5 in FIG. 9). The parsing unit 153 also outputs the log consisting of the extracted elements to the reconstruction unit 154 (see arrow Y6 in FIG. 9).

The reconstruction unit 154 reconstructs the log strings detected by the parsing unit 153 and then labels the log strings. The reconstruction unit 154 disposes the labeled log strings in the order of the definition information and outputs this log as a log corresponding to a series of actions of the attacker (arrow Y7 in FIG. 9).

The information processing device 10 can formalize and reconstruct a series of actions of an attacker based on the input logs. Using the output from the information processing device 10 can eliminate the need for the analyst to investigate or analyze many logs to determine the series of actions of the attacker. In this regard, the information processing device 10 can reduce the load of the analyst in the incident investigation compared to the conventional technologies.

[Procedure of Information Processing Method]

Figures 10, 11:
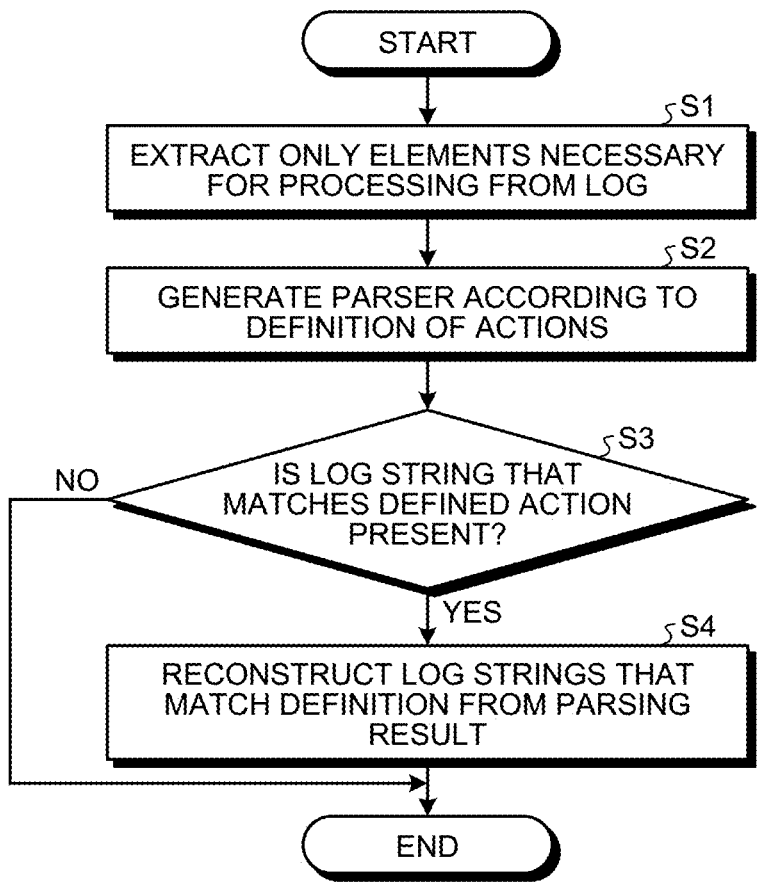
FIG. 10 is a flowchart illustrating the procedure of an information processing method according to the embodiment.
FIG. 11 is a diagram illustrating an example file that defines actions in a formal grammar.

Described next is the procedure of the information processing method performed by the information processing device 10. FIG. 10 is a flowchart illustrating the procedure of the information processing method according to the embodiment.

As illustrated in FIG. 10, the element extraction unit 151 extracts only the elements necessary for the processing from each input log (Step S1) and outputs a log consisting of the extracted elements to the parsing unit 153.

The generation unit 152 generates a parser in accordance with the definition described in a file defining the actions of the attacker (Step S2) and outputs the generated parser to the parsing unit 153.

The parsing unit 153 uses the parser to determine whether the log consisting of the extracted elements includes log strings that match the defined actions (Step S3). If the parsing unit 153 determines that the log consisting of the extracted elements includes no log string that matches the defined actions (No at Step S3), the information processing device 10 ends the procedure.

If the parsing unit 153 determines that the log consisting of the extracted elements includes log strings that match the defined actions (Yes at Step S3), the reconstruction unit 154 reconstructs the log strings that match the definition based on the parsing result and labels the log strings (Step S4). The reconstruction unit 154 disposes the labeled log strings in the order of the definition information and outputs this log as a log corresponding to a series of actions of the attacker. The analyst analyzes the log corresponding to a series of actions of the attacker to investigate an incident.

[Effects of Embodiment]

As described above, the information processing device 10 can output a log corresponding to a series of actions of an attacker by formalizing and reconstructing the series of actions of the attacker based on acquired logs. Using this log allows the analyst to detect a series of actions of an attacker from the output log without investigating or analyzing many logs to determine the series of actions of the attacker. In this regard, the information processing device 10 can reduce the load of the analyst in the incident investigation compared to the conventional technologies.

In the present embodiment, a series of actions of an attacker are defined in a formal grammar. Once the actions are defined, the definition can be, for example, shared or combined. In this regard, a series of actions of attackers can be flexibly defined in a formal grammar.

This configuration allows the analyst, if inexperienced, to appropriately detect and investigate a series of actions of an attacker by using the information processing device 10. According to the present embodiment, the level of an analysis result output by the analyst can be increased to a certain high level.

[Example]

The following describes an example of the present embodiment. The information processing device 10 first defines, in a formal grammar, distinctive elements appearing in a log that records actions, and then detects, from a log to be investigated, log strings that satisfy the definition, and adds labels corresponding to the actions to the detected log strings. The information processing device 10 then disposes the labeled log strings in the order of the definition information and outputs this log as a log corresponding to a series of actions of the attacker.

Figure 12:
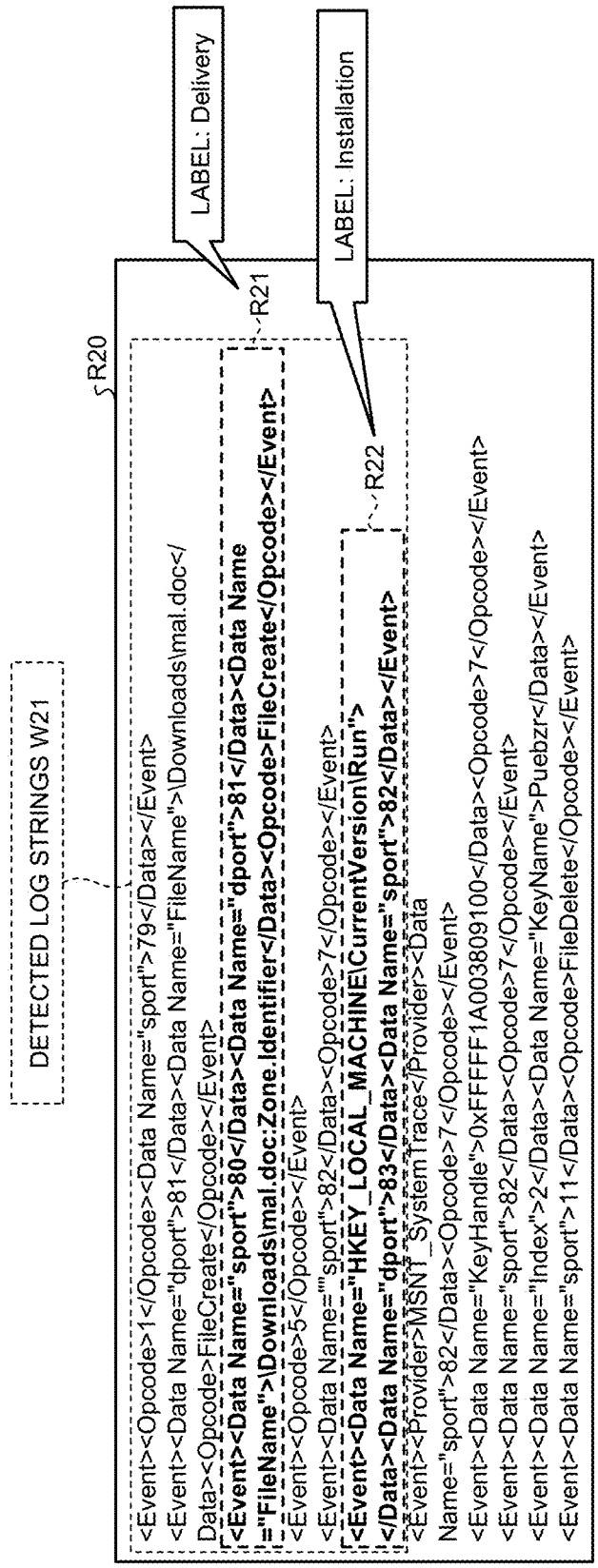
FIG. 12 is a diagram illustrating example log data including log strings that satisfy the definition.

The following describes a specific example of a file that defines the actions of an attacker in a formal grammar. FIG. 11 is a diagram illustrating an example file that defines the actions in a formal grammar. FIG. 12 is a diagram illustrating example log data including log strings that satisfy the definition. In this example, a log R20 is described in XML. Event tags (<Event> ... </Event>) correspond to a single log and the strings surrounded by the event tags constitute a whole log. In the information processing device 10, the reconstruction unit 154 adds a label indicating an action defined by the file T1 in FIG. 11 to a log string corresponding to the action. For example, the reconstruction unit 154 adds a label "Delivery" to a log string R21 in the fourth and fifth rows of detected log strings W21 and adds a label "Installation" to a log string R22 in the eighth and ninth rows thereof (see FIG. 12).

Figure 13:
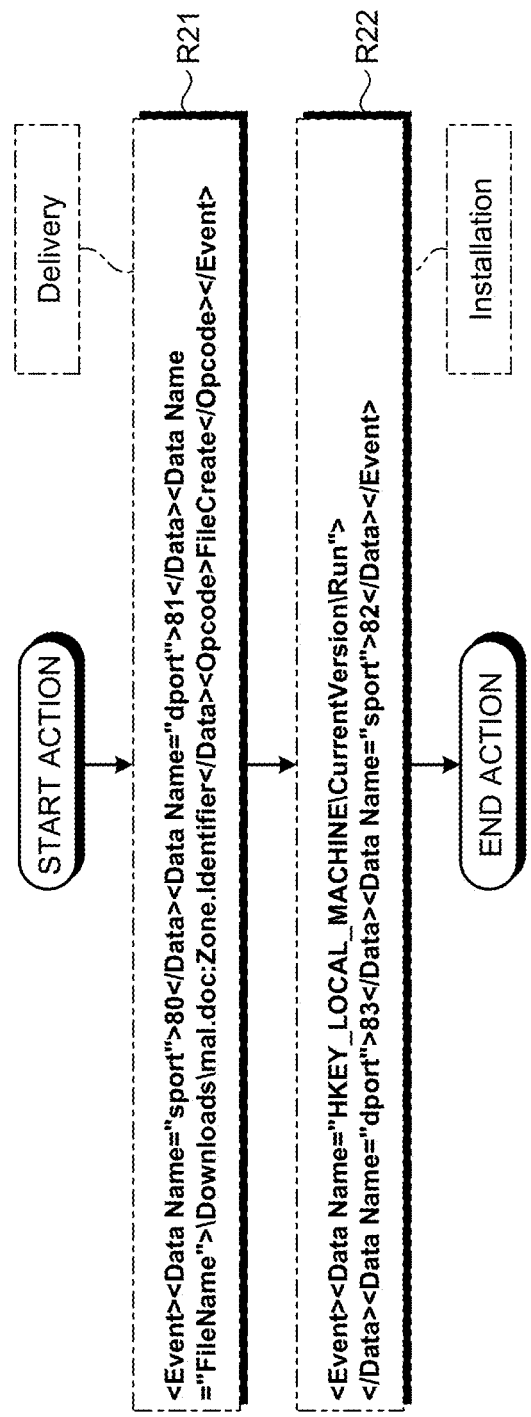
FIG. 13 is a diagram illustrating an example log output by the information processing device.

FIG. 13 is a diagram illustrating an example log output from the information processing device 10. The reconstruction unit 154 disposes the log R22 labeled with "Installation" after the log R21 labeled with "Delivery" in accordance with the order of actions indicated by the formal grammar file T1 (see FIG. 11). The information processing device 10 outputs the logs disposed in accordance with the order of the actions of the attacker as a log representing a formalized series of actions of the attacker.

[System Configurations]

The illustrated components of the devices are functionally conceptual, and need not be physically configured as illustrated. In other words, the specific modes of distribution and integration of the devices are not limited to those illustrated in the drawings, and all or a part thereof can be functionally or physically distributed or integrated in any desired units according to various kinds of load and conditions of use. All or a certain part of the processing functions performed by the devices may be implemented by a CPU and a computer program analyzed and executed by the CPU or may be implemented as hardware using wired logic.

All the automatic processes explained in the present embodiment can be, entirely or partially, carried out manually. Similarly, all the manual processes explained in the present embodiment can be, entirely or partially, carried out automatically by a known method.

The processing procedures, the control procedures, specific names, information including various types of data and parameters mentioned in the description and drawings above can be optionally changed unless otherwise specified.

[Computer Program]

Figure 14:
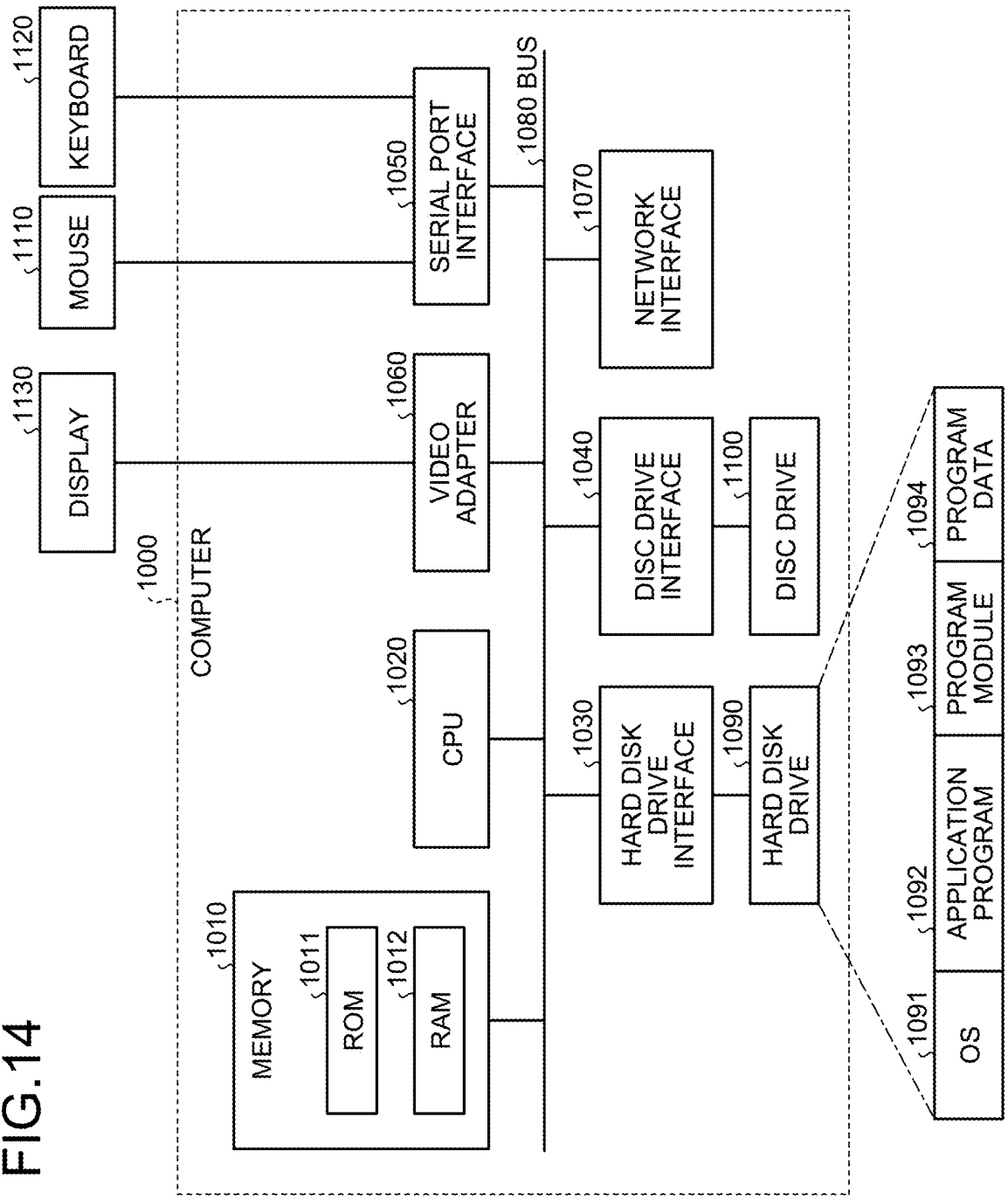
FIG. 14 is a diagram illustrating an example computer implementing the information processing device by executing a computer program.

FIG. 14 is a diagram illustrating an example computer implementing the information processing device 10 by executing a computer program. A computer 1000 includes, for example, a memory 1010 and a CPU 1020. The computer 1000 also includes a hard disk drive interface 1030, a disc drive interface 1040, a serial port interface 1050, a video adapter 1060, and a network interface 1070. These units are connected by a bus 1080.

The memory 1010 includes a read only memory (ROM) 1011 and a RAM 1012. The ROM 1011 stores therein, for example, a boot program such as basic input/output system (BIOS). The hard disk drive interface 1030 is connected to a hard disk drive 1090. The disc drive interface 1040 is connected to a disc drive 1100. To the disc drive 1100, for example, a removable storage medium such as a magnetic disc or an optical disc is inserted. The serial port interface 1050 is connected to, for example, a mouse 1110 and a keyboard 1120. The video adapter 1060 is connected to, for example, a display 1130.

The hard disk drive 1090 stores therein, for example, an operating system (OS) 1091, an application program 1092, a program module 1093, and program data 1094. In other words, the computer program defining the processes of the information processing device 10 is installed as the program module 1093 in which a computer-executable code is described. The program module 1093 is stored in, for example, the hard disk drive 1090. The hard disk drive 1090 stores therein, for example, the program module 1093 that executes the same processing as that of the functional configuration of the information processing device 10. The hard disk drive 1090 may be substituted by a solid-state drive (SSD).

The setup data for use in the processing of the embodiment above is stored in, for example, the memory 1010 or the hard disk drive 1090 as the program data 1094. The CPU 1020 reads, as necessary, the program module 1093 and the program data 1094 stored in the memory 1010 or the hard disk drive 1090 onto the RAM 1012 and executes them.

The program module 1093 and the program data 1094 are not necessarily stored in the hard disk drive 1090, but may be stored in, for example, a removable storage medium and may be read by the CPU 1020 via, for example, the disc drive 1100. Alternatively, the program module 1093 and the program data 1094 may be stored in another computer connected via a network such as a local area network (LAN) or a wide area network (WAN). The program module 1093 and the program data 1094 may be read by the CPU 1020 from the other computer via the network interface 1070.

Although an embodiment of the present invention made by the inventors has been described, the description and the drawings, which are part of the embodiment disclosed herein, are not intended to limit the scope of the present invention. In other words, all the other embodiments, examples, and application techniques made by the skilled person based on the embodiment above are included in the scope of the present invention.

REFERENCE SIGNS LIST

10 Information processing device
11 Communication unit
12 Input unit 13 Output unit
14 Storage unit
15 Controller
151 Element extraction unit
152 Generation unit
153 Parsing unit
154 Reconstruction unit

The invention claimed is:

1. An information processing device comprising:
a memory; and
a processor coupled to the memory and programmed to execute a process comprising:
extracting elements relating to actions of an attacker from each input log;
generating a parser based on definition information that defines the actions of the attacker in a formal grammar, the parser being configured to detect, from a log, a log string having a feature corresponding to an action defined by the definition information;
detecting, from a log consisting of the elements extracted by the extracting, log strings having features corresponding to the actions defined by the definition information by using the parser; and
reconstructing the log strings detected by the detecting, add a label indicating an action defined by the definition information to each of the reconstructed log strings, and output the labeled log strings as a log corresponding to a series of actions of the attacker.

2. The information processing device of claim 1, wherein the definition information is described in a formal grammar dealing with an element as a terminal symbol.

3. The information processing device of claim 1, wherein
the definition information includes information indicating an order of the actions of the attacker, and
the reconstructing disposes the labeled log strings in the order indicated by the definition information and outputs the log as a log corresponding to a series of actions of the attacker.

4. A non-transitory computer-readable recording medium having stored therein an analysis program for causing a computer to execute a process comprising:
a step of extracting elements relating to actions of an attacker from each input log;
a step of generating a parser based on definition information that defines the actions of the attacker in a formal grammar, the parser being configured to detect, from a log, a log string having a feature corresponding to an action defined by the definition information;
a step of detecting, from a log consisting of the elements extracted at the step of extracting the elements, log strings having features corresponding to the actions defined by the definition information by using the parser; and
a step of reconstructing the log strings detected at the step of detecting the log strings, adding a label indicating an action defined by the definition information to each of the reconstructed log strings, and outputting the labeled log strings as a log corresponding to a series of actions of the attacker.

* * * * *